United States Patent
Zhang et al.

(10) Patent No.: US 7,382,609 B2
(45) Date of Patent: Jun. 3, 2008

(54) LATCH MECHANISM FOR DATA STORAGE DEVICE

(75) Inventors: Jun-Xiong Zhang, Guangdong (CN); Zhi-Xin Li, Guangdong (CN); Xin-Hu Gong, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 346 days.

(21) Appl. No.: 11/306,966

(22) Filed: Jan. 17, 2006

(65) Prior Publication Data

US 2006/0284524 A1 Dec. 21, 2006

(30) Foreign Application Priority Data

Jun. 13, 2005 (CN) .................. 2005 2 0060035

(51) Int. Cl.
*G06F 1/16* (2006.01)
(52) U.S. Cl. .............. 361/685; 248/225.11; 312/223.2; 360/265.6
(58) Field of Classification Search .......... 248/222.11, 248/225.11; 312/223.1–223.6; 369/30.43, 369/30.45; 360/256.1, 265.6; 361/679–687, 361/714–727
See application file for complete search history.

(56) References Cited

U.S. PATENT DOCUMENTS 5,599,080 A 2/1997 Ho
5,683,159 A 11/1997 Johnson
6,341,072 B1* 1/2002 Liao ........................... 361/825
7,006,351 B2* 2/2006 Chen et al. ................. 361/685
2005/0063152 A1* 3/2005 Chen et al. ................. 361/685
2005/0099767 A1* 5/2005 Wu ............................ 361/685

FOREIGN PATENT DOCUMENTS

CN 2603967 Y 2/2004
CN 2607642 Y 3/2004

* cited by examiner

Primary Examiner—Hung V Duong
(74) Attorney, Agent, or Firm—Winston Hsu

(57) ABSTRACT

A latch mechanism includes a bracket (30) for receiving a data storage device (10) therein, a latch member (30), and a locking member (20) fixed to a rear end of the data storage device. The bracket includes a pair of hooks (35), and a pair of fixing tabs (37) extending from a bottom wall (31) thereof. The fixing tabs each define a pivoting hole (371) therein. The locking member includes a pair of cutouts (24) for engaging with the hooks, and a folded flange (26). The latch member includes a base wall (41), and a pair of sidewalls (42) extending from an end of the base wall. The sidewalls include a pair of shafts (422) engaging in the pivoting holes of the bracket. The base wall includes a block engaging with the folded flange of the locking member, and a pair of resilient arms (43) engagingly abutting against the bottom wall of the bracket.

17 Claims, 4 Drawing Sheets

LATCH MECHANISM FOR DATA STORAGE DEVICE

FIELD OF THE INVENTION

The present invention relates to a latch mechanism, and more particularly to a latch mechanism for a data storage device.

DESCRIPTION OF RELATED ART

The manufacture and assembly of electronic apparatuses has become increasingly more competitive. Manufacturers continually strive to improve the design and features of electronic apparatuses yet still offer competitive prices. One such area of improvement is mounting of internal devices in an electronic apparatus. An electronic apparatus, such as a typical desktop computer, tower, server, and the like, usually include data storage devices, such as hard disk drives, compact disk read-only memory (CD-ROM) drives, digital video disc (DVD) drives, floppy disk drives, and the like. These devices are typically added to increase the functionality of the electronic apparatus as desired by a user.

U.S. Pat. No. 5,683,159 teaches one typical mounting apparatus for mounting internal devices inside a computer case. The mounting apparatus includes a pair of slide rails. Each slide rail includes a biased mounting post which selectively mates with matching mounting holes in each side of the internal device. As the internal device is slid inside the computer case, the biased mounting post of each slide rail protrudes into one mounting hole of corresponding side of the internal device to reversibly affix the internal device to the computer case. However, the internal device together with the slide rails has to be withdrawn from the computer case, and then make the biased mounting post of each slide rail protrude into another mounting hole of the corresponding side of the internal device when it is desired to change the mounting positions of the internal device.

What is desired, therefore, is a latch mechanism which can change mounting positions of an internal device without withdrawing the internal device in advance.

SUMMARY OF INVENTION

In one preferred embodiment, a latch mechanism includes a bracket for receiving a data storage device therein, a latch member, and a locking member fixed to a rear end of the data storage device. The bracket includes a pair of hooks, and a pair of fixing tabs extending from a bottom wall thereof. The fixing tabs each define a pivoting hole therein. The locking member includes a pair of cutouts for engaging with the hooks, and a folded flange. The latch member includes a base wall, and pair of sidewalls extending from an end of the base wall. The sidewalls include a pair of shafts engaging in the pivoting holes of the bracket. The base wall includes a block engaging with the folded flange of the locking member, and a pair of resilient arms engagingly abutting against the bottom wall of the bracket.

Other advantages and novel features will become more apparent from the following detailed description of preferred embodiments when taken in conjunction with the accompanying drawings, in which:

DETAILED DESCRIPTION

Figure 1:
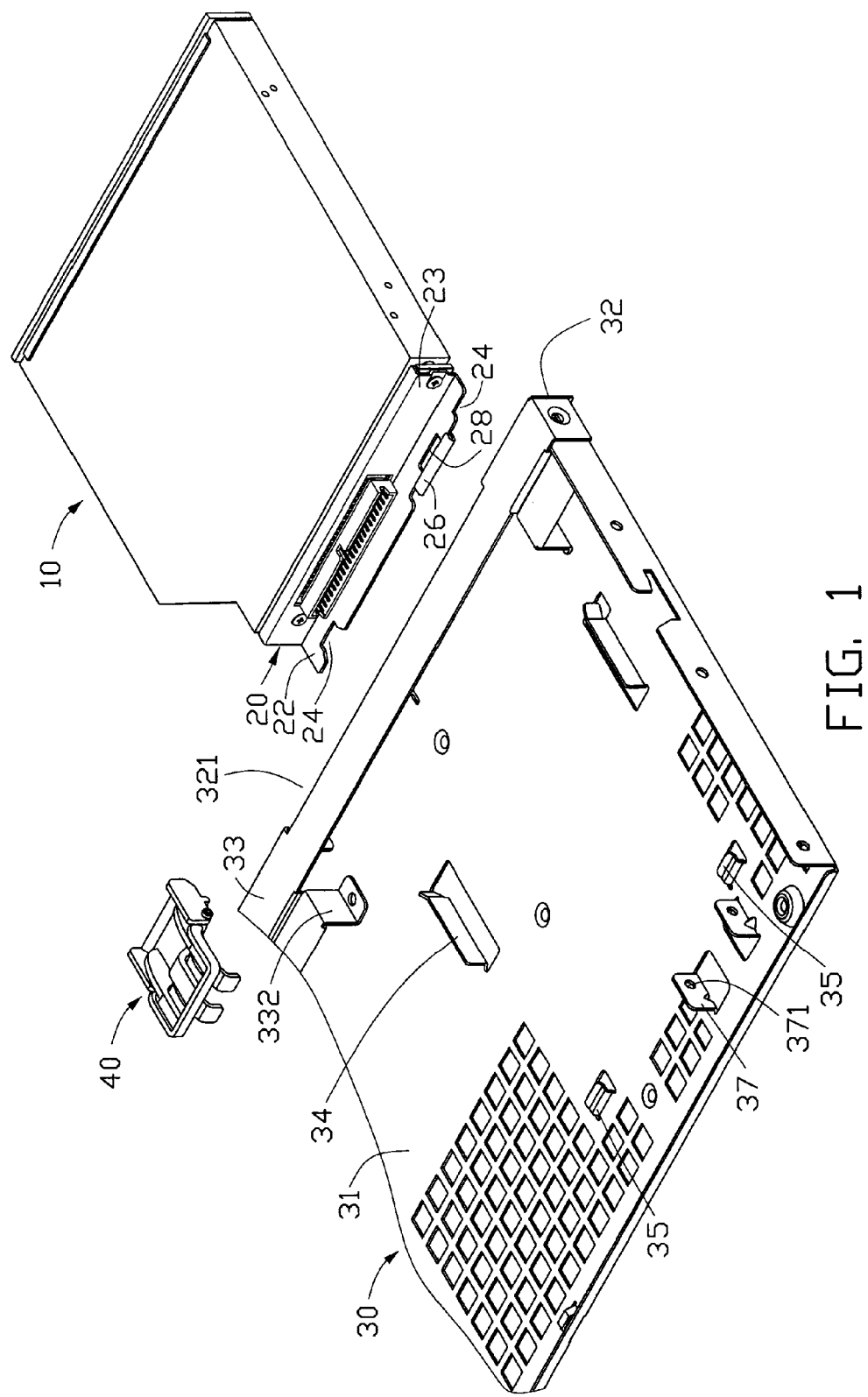
FIG. 1 is an exploded, isometric view of a latch mechanism in accordance with a preferred embodiment of the present invention.
Figure 2:
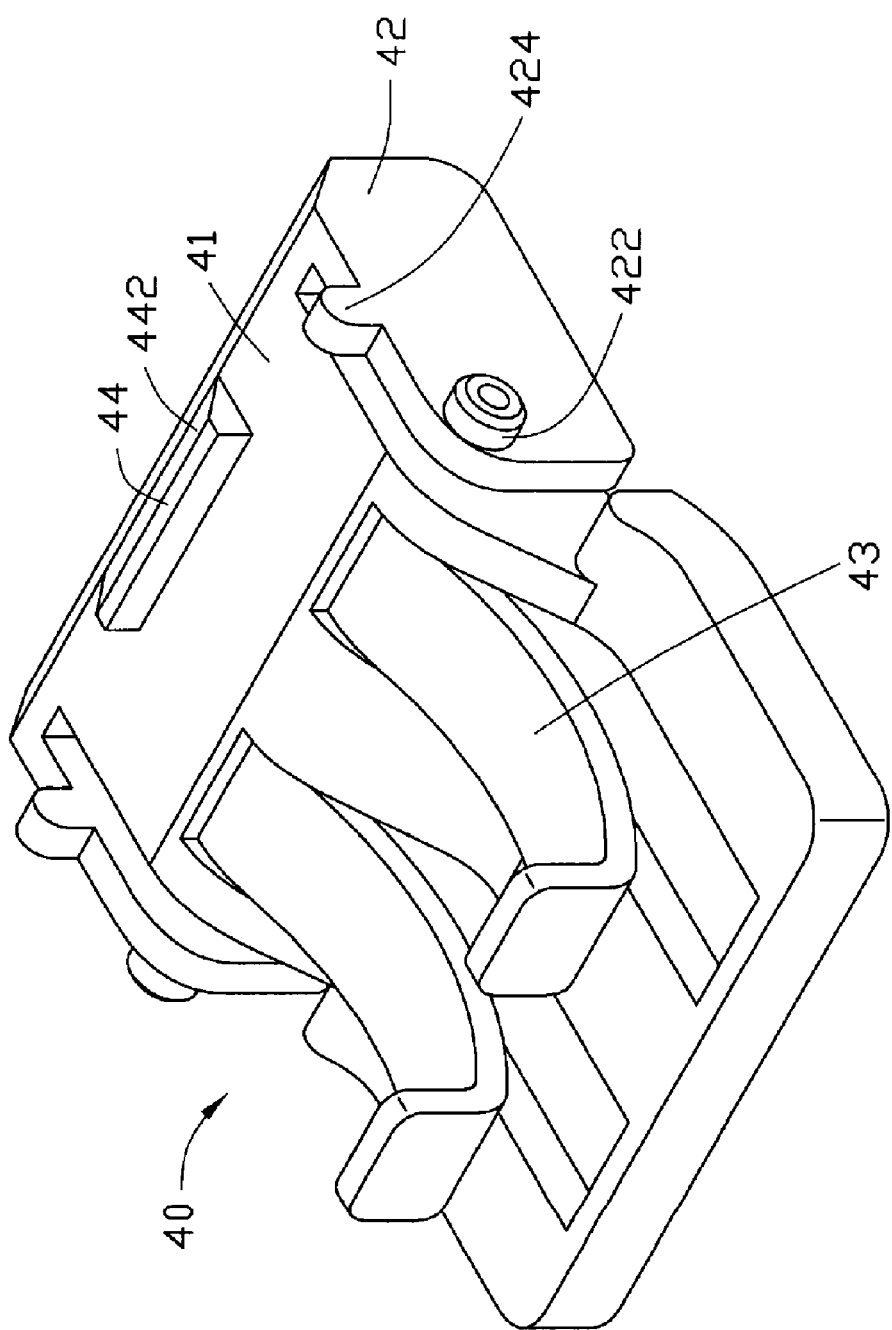
FIG. 2 is an enlarged isometric view of a latch member of the latch mechanism of FIG. 1, but viewed from another aspect.

Referring to FIG. 1, a latch mechanism is provided to fix a data storage device 10. The latch mechanism includes a bracket 30 for receiving the data storage device 10 thererin, a locking plate 20 attached to a rear portion of the data storage device 10, and a latch member 40. In the preferred embodiment, the data storage device 10 is a slim type optical disk driver with different widths.

The bracket 30 includes a bottom wall 31, a front wall 32, and a top wall 33. An opening 321 is defined in the front wall 32, for the data storage device 10 moving therethrough. A pair of spaced first guiding tabs 332 extends from the top wall 33 and is attached to the bottom wall 31. A pair of spaced second guiding tabs 34 is stamped upwardly from the bottom wall 31 behind the first guiding tabs 332, corresponding to the opening 321. A distance between the first guiding tabs 332 and a distance between the second guiding tabs 34 separately accord with the widths of the data storage device 10. A pair of spaced fixing tabs 37 is stamped upwardly from a rear portion of the bottom wall 31, corresponding to the opening 321. A pivoting hole 371 is defined in each of the fixing tabs 37. A pair of hooks 35 extends from the bottom wall 31 behind the fixing tabs 37, toward the opening 321.

The fixing member 20 includes a first plate 22, and a second plate 23 perpendicular to the first plate 22. The second plate 23 is fixed to a rear end of the data storage device 10. The first plate 22 defines a pair of cutouts 24 in a rear portion thereof, for engaging with the hooks 35 of the bracket 30. A folded flange 26 is formed from a rear edge of the first plate 22. A slot 28 is defined in the first plate 22 beside the folded flange 26.

The latch member 40 includes a base wall 41, and a pair of sidewalls 42. The base wall 41 has a curved configuration. The sidewalls in parallel 42 extend from an end of the base 41. A pair of shafts 422 extends perpendicularly from the sidewalls 42, corresponding to the pivoting holes 371 of the bracket 30. A pair of protrusions 424 extends downwardly from bottom portions of the sidewalls 42. A block 44 extends from a rear edge of the base wall 41. A sloping wall 442 is formed on the block 44 and extends to the base wall 41. A pair of resilient arms 43 downwardly extends from a middle portion of the base wall 41.

Figure 3:
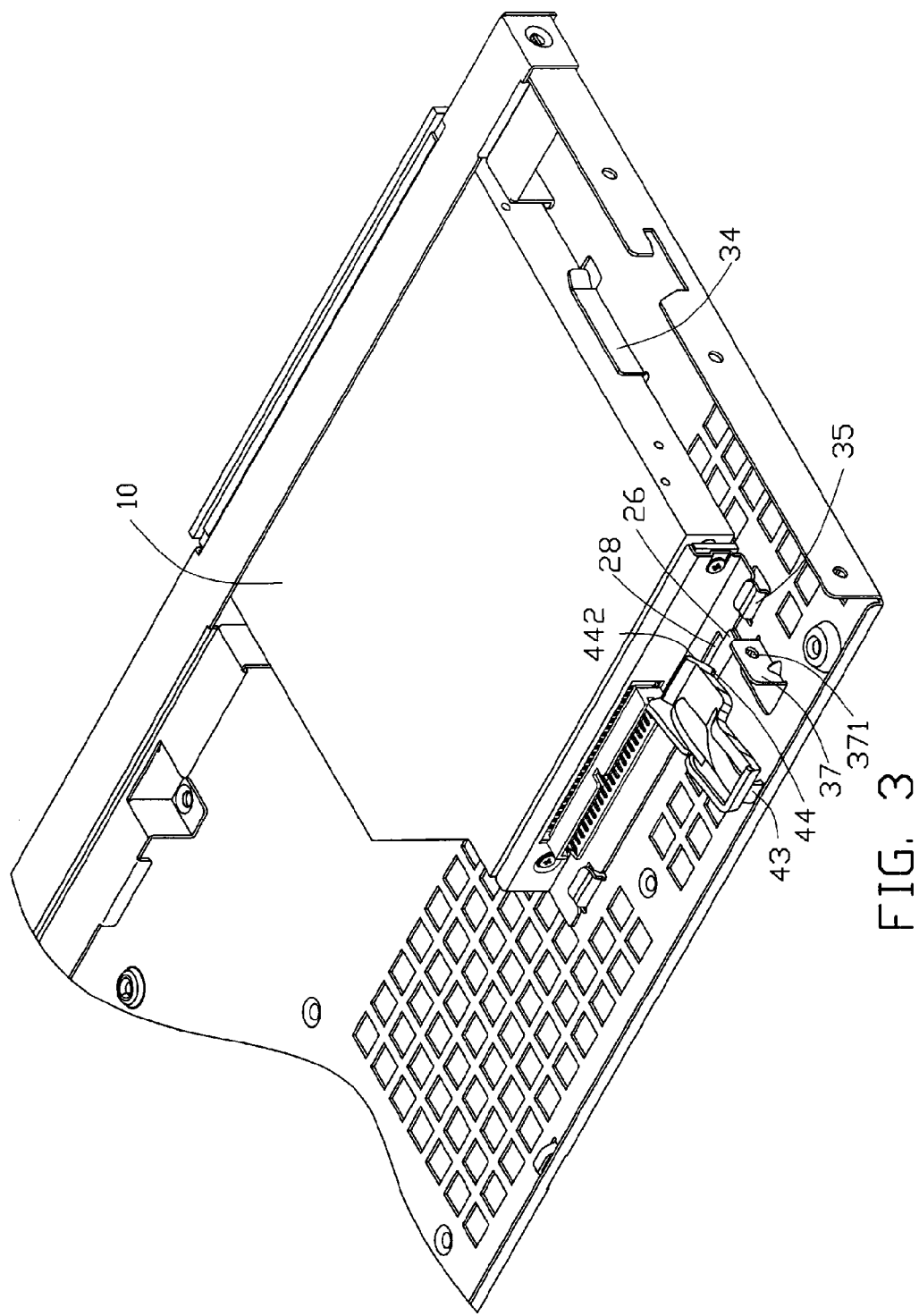
FIG. 3 and FIG. 4 are assembled views of FIG. 2, showing the latch mechanism in different states.
Figure 4:
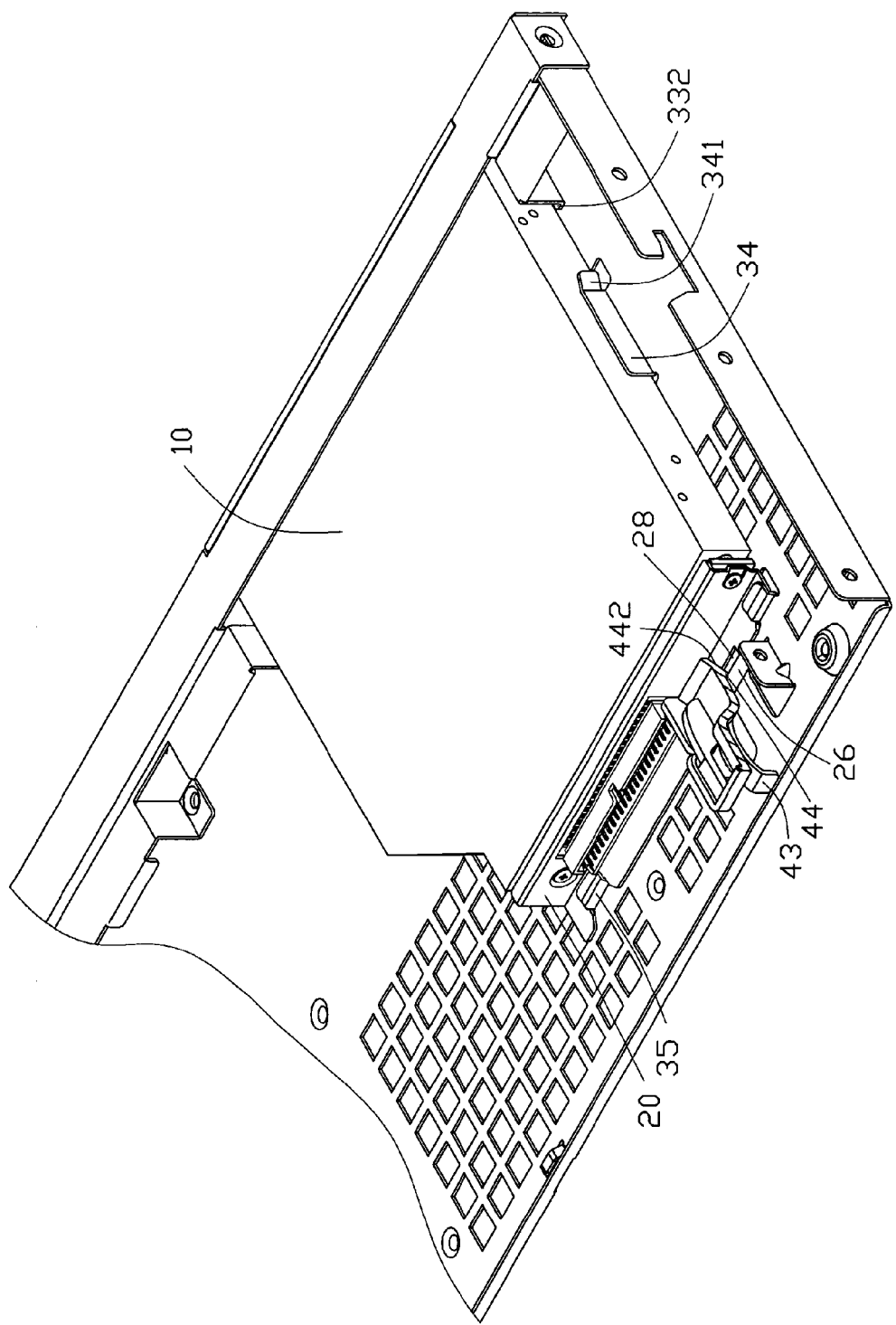

Referring to FIGS. 3 and 4, in assembly, the locking member 20 is attached to the data storage device 10, with the second plate 23 thereof fixed to the data storage device 10. The latch member 40 is pivotally attached to the bracket 30, with the shafts 422 engaging in the pivoting holes 371 of the fixing tabs 37.

In use, the data storage device 10 is moved into the bracket 30 from the opening 321, with sidewalls of the data storage device 10 sliding along the first and second guiding tabs 332, 34. The hooks 35 of the bracket 30 engage with the cutouts 24 of the locking member 20. The folded flange 26 gradually contacts the slope wall 442 of the latch member 40. With further movement of the data storage device 10, the folded flange 26 of the locking member 20 abuts against the sloping wall 442 to rotate the latch member 40. The resilient arms 43 of the latch member 40 deform and abut against the bottom wall 31 of the bracket 30. The folded flange 26 slides over the sloping wall 442 and engages with the block 44. The block 44 is received in the slot 28 and the resilient arms 43 rebound. The protrusions 424 cooperate with the resilient arms 43 to balance the latch member 40. Thus, the data storage device 10 is secured in the bracket 30.

Referring to FIG. 5, to release the data storage device 10 from the bracket 30, a front portion of the base wall 41 of the latch member 40 is pressed downwardly to rotate about the shafts 422 thereof, the block 44 disengages from the folded flange 16 and the slot 28. The data storage device 10 is easily moved out of the bracket 30.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A latch mechanism comprising:
    a bracket for receiving a data storage device, the bracket comprising a bottom wall, a pair of hooks extending from a rear portion of the bottom wall;
    a latch member pivotally attached to the bracket and comprising a block, and a pair of resilient arms engagingly abutting against the bottom wall of the bracket; and
    a locking member attached to a rear end of the data storage device and comprising a pair cutouts engaging with the hooks, and a locking portion extending therefrom to engage with the block.

2. The latch mechanism as claimed in claim 1, wherein the locking member comprises a plate, the cutouts are defined in a free end of the first plate.

3. The latch mechanism as claimed in claim 2, wherein the locking portion is a folded flanges formed from the plate.

4. The latch mechanism as claimed in claim 3, wherein the plate defines a slot beside the folded flange, corresponding to the block.

5. The latch mechanism as claimed in claim 1, wherein the latch member comprises a base wall, and a pair of sidewalls, the base wall extends from ends of the sidewalls.

6. The latch mechanism as claimed in claim 5, wherein the bottom wall of the bracket comprises a pair of fixing tabs extending therefrom, a pivoting hole is defined in each of the fixing tabs, a pair of shafts extends from the sidewalls of the latch member to engage in the pivoting holes.

7. The latch mechanism as claimed in claim 5, wherein the block is extending from an edge of the base wall, a sloping wall is formed on the block and extends to the base wall.

8. The latch mechanism as claimed in claim 5, wherein the resilient arms extend from the base wall of the bracket.

9. The latch mechanism as claimed in claim 5, wherein the sidewalls of the latch member comprises a pair of protrusion extending from bottom portions thereof.

10. The latch mechanism as claimed in claim 1, wherein the bottom wall of the bracket comprises a pair of first guiding tabs, and a pair of second guiding tab, for engaging with sidewalls of the data storage device.

11. A latch mechanism assembly comprising:
    a data storage device;
    a locking member fixed to a rear end of the data storage device and comprising a first fastener, and a locking portion extending therefrom;
    a bracket receiving the data storage device therein and comprising a bottom wall, the bottom wall comprising a second fastener engaging with the first fastener; and
    a latch member pivotally attached to the bottom wall of the bracket, the latch member comprising a block interlocking with the locking portion of the locking member, and at least one resilient arm engagingly abutting against the bottom wall of the bracket.

12. The latch mechanism assembly as claimed in claim 11, wherein the first fastener is a pair of cutouts defined in an free end of the locking member, the second fastener is a pair of hooks extending from the bottom wall of the bracket.

13. The latch mechanism assembly as claimed in claim 11, wherein the locking portion is a folded flange formed from an edge of the locking member.

14. The latch mechanism assembly as claimed in claim 11, wherein the latch member comprises a base wall, and a pair of sidewalls extending from an end of the base wall, the base wall has a curved configuration.

15. The latch mechanism assembly as claimed in claim 14, wherein the block extends from an edge of the base wall of the latch member, a sloping wall forms on the block and extends to the base wall.

16. The latch mechanism assembly as claimed in claim 14, wherein said resilient arm extends from a middle portion of the base wall of the bracket.

17. The latch mechanism assembly as claimed in claim 14, wherein the bracket comprises a pair of fixing tabs extending from the bottom wall thereof, a pivoting hole is defined in each of the fixing tabs, a pair of shafts extends from the sidewalls of the bracket to engage in the pivoting holes.

* * * * *